United States Patent
Wittmann

[11] 4,000,350
[45] Dec. 28, 1976

[54] BATTERY DESIGN
[75] Inventor: Alois Wittmann, Palos Verdes, Calif.
[73] Assignee: Hughes Aircraft Company, Culver City, Calif.
[22] Filed: Mar. 17, 1975
[21] Appl. No.: 559,274
[52] U.S. Cl. .................. 429/66; 429/121; 429/163; 429/164; 429/178
[51] Int. Cl.² ..................... H01M 4/18
[58] Field of Search .......... 136/6 R, 83 R, 100 R, 136/100 M, 112-114

[56] References Cited
UNITED STATES PATENTS

| | | | |
|---|---|---|---|
| 2,847,494 | 8/1958 | Jeannin | 136/114 X |
| 2,852,592 | 9/1958 | Salauze | 136/113 X |
| 3,148,090 | 9/1964 | Saslow | 136/100 R |
| 3,256,504 | 6/1966 | Fidelman | 136/100 M X |
| 3,432,350 | 3/1969 | Wilson | 136/100 M X |
| 3,445,295 | 5/1969 | Smith et al. | 136/100 R X |
| 3,497,393 | 2/1970 | Dreisbach et al. | 136/100 R |
| 3,563,804 | 2/1971 | Garcin et al. | 136/83 R X |
| 3,625,769 | 12/1971 | Lyall | 136/83 R |
| 3,743,545 | 7/1973 | Merz et al. | 136/114 |

Primary Examiner—Anthony Skapars
Assistant Examiner—C. F. LeFevour
Attorney, Agent, or Firm—Noel B. Hammond; W. H. MacAllister

[57] ABSTRACT

A battery comprising a battery vessel, battery plates having a central aperture, electrolye impregnated separator, a battery plate holder and a battery plate retainer. The battery plate holder comprises a base retainer and a central tube protruding from the base retainer. The battery plates are placed onto the battery plate holder by inserting the central tube through the apertures in the battery plates. The battery plate retainer holds the plates onto the battery plate holder and the complete assembly comprising the battery plates, the holder and cover is mounted with the battery vessel by coupling the base plate of the holder to the interior of the vessel.

7 Claims, 5 Drawing Figures

BATTERY DESIGN

RELATION TO GOVERNMENT CONTRACT

The invention herein described was made in the course of a contract, or subcontract thereunder, with the Department of the Air Force.

FIELD OF THE INVENTION

This invention relates to batteries and more particularly to batteries having a plurality of stacked plates.

DESCRIPTION OF THE PRIOR ART

It is frequently necessary, when constructing compact multiplate batteries, to assemble the battery plates in a stack. In assembly, the positive and negative plates are alternated in the stack with electrolyte impregnated separators between the plates. The completed stack is mounted in a vessel and the appropriate electrical interconnections are made. Presently, the stack is assembled from imperforate battery plates clamped between a base plate and a cover plate by longitudinal bolts external to the stack. The completed stack is then mounted in a battery vessel by coupling both ends of the assembled stack to the interior of the vessel. There are several major difficulties with this structure. The first is that since the battery plates are held in alignment only by the frictional forces between battery plates, the battery plates can shift position under vibration. Secondly, since the stack is coupled to the vessel at both the top and bottom, changes in the vessel shape cause the stack to be distorted thereby altering its electrical characteristics. Thirdly, since additional space between the stack and vessel must be allowed for the external longitudinal bolts, the thermal characteristics of the stack vary thereby creating localized high temperature areas and uneven loading of the stack.

Accordingly, it is a general object of the present invention to provide a battery whose battery plate stack is substantially unaffected by changes in the vessel size or shape.

It is another object of the present invention to provide a battery whose battery plate stack is substantially unaffected by vibration.

It is yet another object of the present invention to provide a battery whose battery plate stack has uniform thermal characteristics.

SUMMARY OF THE INVENTION

In keeping with the principles of the present invention, the objects are accomplished with the unique combination of a battery vessel, battery plates having central apertures, electrolyte, a battery plate holder, and a battery plate retainer. The battery plate holder comprises a base retainer and a non-conductive central tube protruding from the base plate. The battery plates are placed onto the battery plate holder by inserting the central tube through the aperture in te battery plates. During assembly of the stack of battery plates, a separator is placed between each plate. The battery plate retainer is mounted to the free end of the stack and holds the plates in compression onto the battery plate holder. The completed assembly is mounted in the battery vessel by coupling only the base retainer of the battery plate holder to the interior of the battery vessel. To complete the electrical assembling, the positive and negative plates are coupled respectively to separate terminals which feed through the battery vessel.

BRIEF DESCRIPTION OF THE DRAWINGS

The above-mentioned and other features and objects of the present invention will become more apparent by reference to the following description taken in conjunction with the accompanying drawings, wherein like reference numerals denote like elements, and in which.

DESCRIPTION OF THE PREFERRED EMBODIMENT

Figure 1:
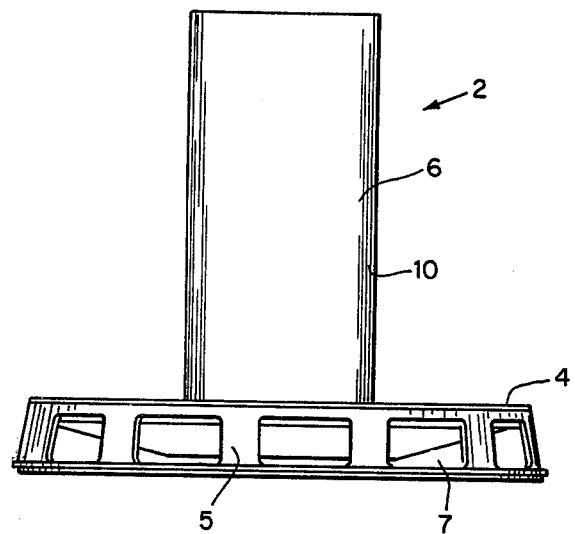
FIG. 1 is an elevation view of a battery plte holder in accordance with the teachings of the present invention.
Figure 2:
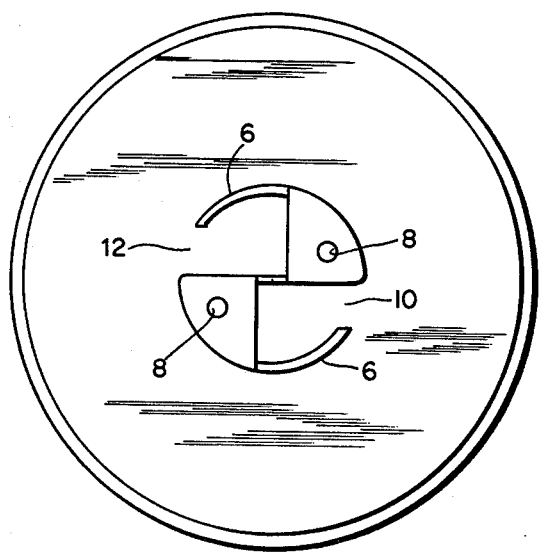
FIG. 2 is a plan view of a battery plate holder in accordance with the teachings of the present invention.

Referring more specifically to the drawings, FIG. 1 and FIG. 2 are respectively an elevation view and a plan view of a battery plate holder 2 in accordance with the teachings of the present invention. The plate holder 2 comprises a base retainer 4, a central tube 6 protruding from base retainer 4, and a metallic weld ring 5. Base retainer 4 and tube 6 are made from a non-conductive material. Tube 6 is coupled at one end to base plate 4 and the other end of tube 6 is partially closed and contains screw holes 8. Furthermore, tube 6 has two opposing longitudinal slots 10 and 12 therein. Weld ring 5 is coupled at one edge to base retainer 4 and has perforations 7 equally spaced about its circumference.

Figure 3:
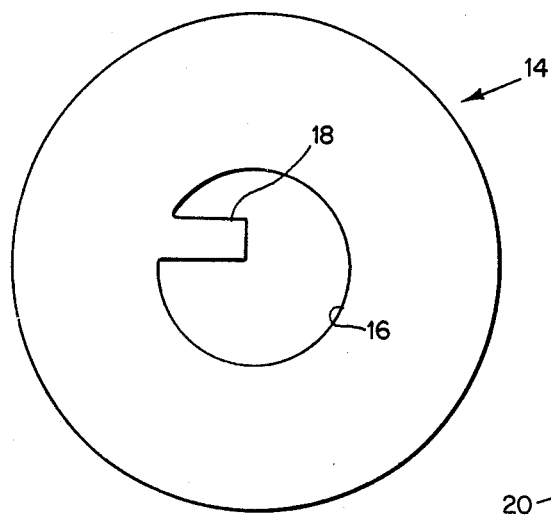
FIG. 3 is a plan view of a battery plate in accordance with the teachings of the present invention.

Referring to FIG. 3, FIG. 3 is a plan view of a battery plate 14 in accordance with the teachings of the present invention. Plate 14 is a disc having a central aperture 16 therein. Battery plate 14 further has a tab 18 protruding into aperture 16.

Figure 4:
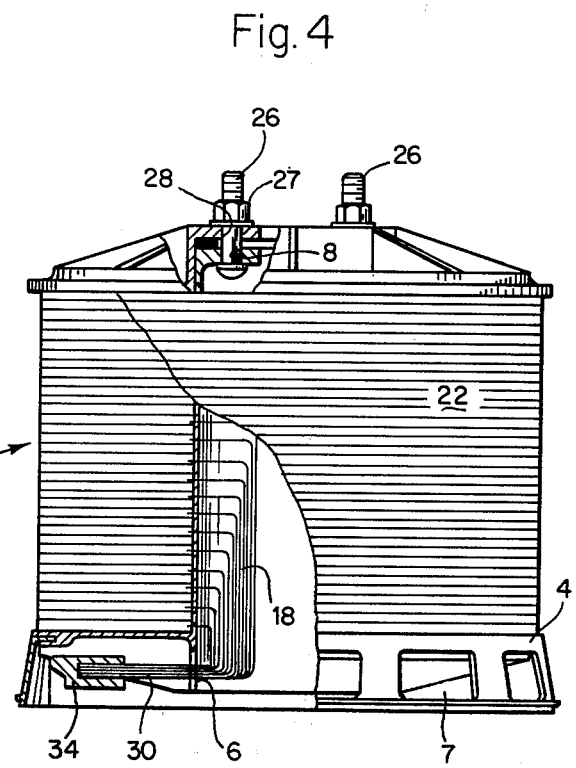
FIG. 4 is a partial section of an elevation view of a completed battery cell in accordance with the teachings of the present invention.

FIG. 4 is a partial section of an elevation view of a completed battery cell 20 in accordance with the teachings of the present invention. Plates 14 are mounted onto battery plate holder 2 by inserting central tube 6 through apertures 16 of plates 14. Tabs 18 of negative and positive plates 14 protrude respectively into slots 10 and 12 of tube 6. Also, elctrolyte impregnated separators, not shown, are situated between plates 14. The stack 22 of battery plates 14 comprises a stack of alternating positive and negative plates 14. Furthermore, battery plate retainer 24 of substantially dish shape is coupled to one end of tube 6 by two nuts 27 and two bolts 26 through holes 8 in tube 6 and holes 28 in battery plate retainer 24. The longitudinal height of and/or pressure on stack 22 is set by tightening nuts 27 and bolts 26. Electrical leads 30 and 32, coupled respectively to positive and negative plates 14, are combined into single leads 34 and 36.

Figure 5:
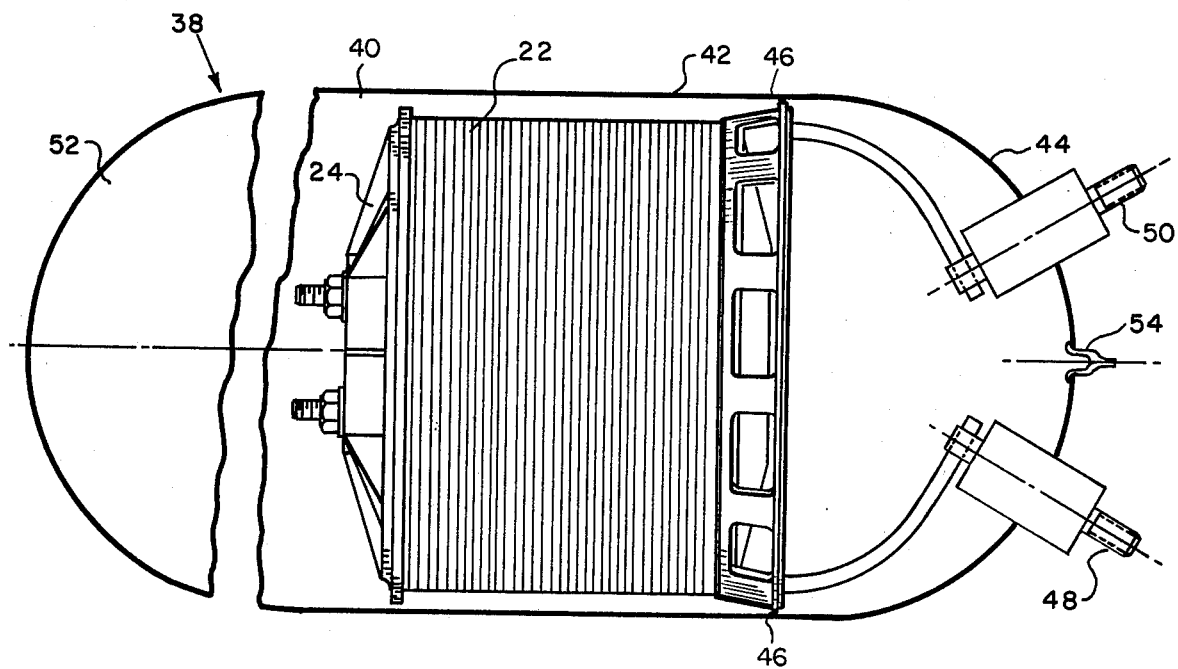
FIG. 5 is a section of an elevation view of a battery in accordance with the teachings of the present invention.

FIG. 5 is a section of an elevation view of a battery 38 in accordance with the teachings of the present invention. Cell 20 is inserted into cylindrical portion 40 of battery pressure vessel 42. The other edge of weld ring 5 of battery plate holder 2 is engaged with the circumferential edge of cylindrical portion 40 of a hemispherical portion 44. Cylindrical portion 40, hemispherical portion 44 and weld ring 5 are coupled together by a single circular weld 46 thereby forming a completed pressure vessel 42. Furthermore, since weld ring 5 has equally spaced perforations 7, base retainer 4 is flexibly coupled to the interior of vessel 42. Since cell 20 is flexibly coupled to the interior of vessel 42 at a single end, the cell 20 is substantially independent of radial and axial growth of vessel 42 thereby minimizing mutual mechanical or structural loading and is otherwise free to move relative to vessel 42. Leads 34 and 36 are coupled respectively to feedthrough terminals 48 and 50. Feedthrough terminals 48 and 50 are electrically insulated from vessel 42. Furthermore, pressure vessel 42 is filled with a pressurized gas 52 via fill valve 54.

In practice, the positive and negative battery plates 14 are conventional, and may be made of any suitable material. Some satisfactory materials for the positive and negative battery plates 14 are disclosed in Volume 122, No. 1, of the Journal of the Electrochemical Society, January 1975, The Sealed Nickel-Hydrogen Secondary Cell, by Jose Giner and James D. Dunlop, pp. 4–11. The electrolyte can be a base such as potassium hydroxide. Furthermore, the separator can be made from a material which has high wetability, high gas permeability and high resistance to degradation by the electrolyte. Such a material can be a fibrous asbestos felt. In addition, vessel 42 can be made from a high strength nickel base alloy such as Inconel 718. Also, the pressurized gas can be hydrogen.

In all cases it is understood that the abovedescribed embodiment is merely illustrative of but one of the many possible specific embodiments which can represent application of the principles of the present invention. Numerous and varied other arrangements can be readily devised in accordance with these principles by those skilled in the art without departing from the spirit and scope of the invention.

What is claimed is:

1. An improvement in a battery of the type having a stack of battery plates mounted on an insulating tube which passes through apertures in said plates, said stack being compressed between a base retainer and a battery plate retainer which are fastened to opposite ends of said tube, wherein the improvement comprises: said stack disposed within a pressure vessel, only one of said retainers fastened thereto so that said stack is otherwise free to move relative to said vessel and there is substantially no mutual mechanical loading between said stack and said vessel, said vessel being pressurized with a gas and sealed.

2. The battery of claim 1 in which said pressure vessel comprises two sections, and said sections and one of said retainers are fastened together by a single weld.

3. The battery of claim 1 in which the pressure loading of said stack is set to a desired amount by tightening at least one threaded fastener which holds said battery plate retainer to said tube.

4. The battery of claim 1 in which the axial dimension of said stack is set to a desired amount by tightening at least one threaded fastener which holds said battery plate retainer to said tube.

5. The battery of claim 1 in which said tube has two opposing longitudinal slots therein, said plates having tabs protruding into said apertures and extending into and engaging said slots, said tabs of said plates of one polarity engaging one of said slots, and said tabs of said plates of the opposite polarity engaging the other of said slots.

6. The battery of claim 2 in which said retainer which is welded to said vessel includes perforations to form attachment lugs which extend between said retainer and said vessel to provide negligible radial constraint and flexible mounting.

7. The battery of claim 5 in which electrical conductors extend through said slots and electrically connect said tabs to electrical terminals provided in said pressure vessel.

* * * * *